Sept. 3, 1957 W. R. SWANSON 2,805,055
WEIGHING APPARATUS
Filed Dec. 17, 1953

INVENTOR:
Willis R. Swanson,
BY
Dawson, Tilton & Graham,
ATTORNEYS.

United States Patent Office 2,805,055
Patented Sept. 3, 1957

2,805,055

WEIGHING APPARATUS

Willis R. Swanson, Wichita, Kans., assignor to Control Cells Corporation, Inc., Wichita, Kans., a corporation of Kansas Application December 17, 1953, Serial No. 398,732

8 Claims. (Cl. 265—71)

This invention relates to weighing apparatus and, more particularly, to a portable platform-type weighing device wherein the article or thing to be weighed (or a force to be determined) is received upon or is applied against the platform of the device. The device is quite flexible and its uses are numerous and, generally stated, it may be used in substantially all types of weighing operations for the accuracy of response is within close limits throughout substantially its entire range. The apparatus is particularly suited for the weighing of vehicles such as tractor-trailer rigs wherein the wheels of the rig are driven onto a number of the devices, one for each wheel assembly.

The present invention constitutes a continuation-in-part of the invention disclosed in my co-pending application, Serial No. 392,563, filed November 17, 1953 now Patent 2,709,790.

There is considerable application for lightweight portable weighing apparatus that may be readily moved from one location to another. Particularly is there a need in the weighing of vehicles such as tractor-trailer combinations to ascertain the weights carried thereby for both the protection of the vehicle itself and the road over which the vehicle operates. Heretofore portable weighing apparatus has not been used extensively for even though it is, in a limited sense, portable, it has been quite heavy and difficult to transport and at the same time has been difficult to set up for operation. Moreover, the accuracy of response in known apparatus is not particularly good, and the weight indications are not true within close limits so that the indications can be relied on as an accurate representation of a load imposed thereon.

It is accordingly an object of this invention to provide lightweight portable weighing apparatus that may be easily transported from one location to another and that may be set up for operation in a minimum of time and with a minimum of effort. Another object of the invention is to provide in such apparatus means for obtaining within close limits an accurate representation of the magnitude of a load or force imposed thereon. Yet another object of the invention is to provide portable weighing apparatus that is rugged and which will withstand arduous use. Yet another object is to provide portable weighing apparatus that gives accurate weight indications quickly, whereby only a short time is required in the weighing of vehicles. Actually, the response may be so rapid that it is unnecessary for a vehicle to come to a complete stop in order that the weight or wheel loadings of the vehicle be ascertained.

A further object is to provide weighing apparatus wherein the weight is imposed by lever means across a deflecting member that carries electric indicating means. Still a further object is to provide in such apparatus a lever balance arrangement wherein mechanical hysteresis is held to a minimum. Yet a further object is to provide a multiple lever arrangement in a portable platform scale wherein accurate response to the magnitude of a load imposed thereon is obtained even though the load is not properly centered upon the platform. Additional objects and advantages will appear as the specification proceeds.

An embodiment of the invention is illustrated in the accompanying drawing, in which—

Fig. 1 is a perspective view of weighing apparatus embodying my invention; Fig. 2 is a top plan view of the weighing device; and Fig. 3 is a longitudinal sectional view taken on the line 3—3 of Fig. 2.

Referring first to Fig. 1, it is seen that weighing apparatus is therein illustrated and that consists of a weighing device or platform A coupled to an indicator and control unit B through an electric cable C. While the indicator and control box B are intended to be used with the apparatus and embody therein the electric circuits, indicator, and balancing arrangement employed in the system, such features are not herein disclosed in the present application since they have been disclosed and are covered in co-pending application Serial No. 392,563, referred to above.

Referring now most particularly to Fig. 3, it is seen that the platform or weighing device A has a base comprised of the feet or pedestal members 10 which are adapted to be received upon the ground or other supporting surface. Secured to each of the feet or plates 10 by screws 11 is a mounting plate 12. Secured in turn to the mounting plate 12 are the knife-edged bearing members 13 which may, if desired, be rigidly held in place upon the plates 12 by means of the screws 14. As is seen best in Fig. 2, four individual knife-edged bearing members 13 are provided, two on each of the mounting plates 12 and which are in spaced-apart relation.

Fulcrumed upon the knife-edged bearing members 13 at one end of the apparatus is a lever 15, while fulcrumed upon the bearing members 13 at the opposite end of the device is the lever arm 16. The lever arm 15 is anchored to the mounting plate 12 by means of the bolt 17 which extends through the arm 15 and through the plate 12, the head being imbedded therein, and has threaded thereon a nut 18 that bears against the plate 12 and makes a rigid vertical stud. Preferably, the arm 15 is resiliently urged downwardly into tight engagement with the upwardly-oriented knife edge of the bearing members 13 by means of a rubber grommet or coil spring 19 which seats at one end upon the head of the bolt 17 and at its opposite end upon a shoulder provided by the bore 20 within the arm 15. The lever arm 16 is similarly mounted. This resilient mounting permits free pivotal movement of the lever arms relative to the mounting plates and studs 17. The bearing members 13 may be welded or brazed to the members 12.

A platform member 21 is seen to enclose the lever arms 15 and 16 and elements associated therewith, and consists of an enlarged horizontal platform surface 22 formed integrally with depending side walls 23. The walls 23 are recessed short of the lower edges thereof and provide shoulder portions 24 that are abutted by mounting blocks 25 that have rigidly secured thereto knife-edged bearing members 26 that provide knife edges that are downwardly oriented. As is again seen best in Fig. 2, four individual bearing members 26 are provided, two for each lever arm, and each pair of bearing members are spaced apart and are in longitudinal alignment with the bearing members 13 heretofore described. The bearing members 26 bear downwardly upon the upper surface of the lever arms 15 and 16 and thereby provide a support and mounting for the platform member 21. The bearing members 26 are identical at both ends of the apparatus.

The platform member 21 is resiliently anchored to the lever arms 15 and 16 by means of the studs 27, each threadedly received within an appropriate threaded aperture within a depending flange portion 28 provided by the platform member 21 and extending freely respectively through the lever arms 15 and 16. Check nuts 29 threaded onto studs 27 are interposed between the bottom surface of the flange 28 and the lever arms to provide a safety stop to limit the upward movement of the lever arms. A coil spring or other resilient member 30, such as a rubber grommet, which seats at one end upon the head or nut 30a of the stud 27 and at its other end upon a shoulder 31 provided by the recess 32 within each of the lever arms, provides the resilient urging of the lever arms toward the flange 28 while permitting free pivotal movement thereof.

The lever arm 15 is seen to extend normally in a substantially horizontal plane and to project inwardly to the center of the apparatus. The lower surface of the arm is provided with a V-shaped recess 33 which rockingly receives therein the upper knife-edged surface of a rock bar 34 which provides a depending knife-edged surface which in turn is rockingly received within a V-shaped recess 35 provided in the extension 36 of the lever arm 16. Thus the lever arms 15 and 16 are seen to be coupled together and are both urged upwardly toward the platform member 21 by the spring and bolt assemblies heretofore described.

A sensing member 37 is interposed between the upper lever arm 15 and the bottom surface of the platform member 21. The load-responsive member 37 is equipped with an upwardly-extending, knife-edged bearing member 38, the knife-edged surface of which is received within a V-shaped recess 39 provided by a bearing plate 40 rigidly secured to the platform member 21 between the depending bosses 41 provided thereby. Similarly, the sensing device 37 is equipped along its bottom side with a knife-edged bearing member 42 which has a knife edge received within a V-shaped recess 43 provided in the upper surface of the lever arm 15. It will be noted that the recesses 39 and 43 and 33 and 35, which all receive the knife edges of the bearing members, have walls that diverge at a sharper angle than the angle of inclination of the bearing members whereby substantially a line contact between the bearing members and the members urged thereagainst is provided.

The sensing device 37 has mounted therein a U-shaped deflector member having spaced-apart legs that are adapted to be deflected when a load is imposed thereacross. The member is not illustrated in the drawing since it forms per se no part of the present invention and is disclosed in detail in the co-pending application previously referred to.

It is seen in Fig. 2 that the bearing member 38 as well as the bearing member 42 provided by the device 37, are elongated and extend substantially across the tapered inner end of the arm 15. It is also apparent from the showing in Fig. 2 that four cap screws 27 are provided, two for anchoring the arm 15 to the platform member 21 and two for anchoring the arm 16 to the platform member 21.

If desired, the top surface 22 of the platform member may be equipped with a plurality of spaced recesses 44 which will facilitate the gripping of a vehicle tire and firm support thereof upon the platform member.

*Operation*

In operation of the weighing apparatus a weight or force the magnitude of which is to be ascertained, is applied against the upper surface 22 of the platform member 21. If it is desired to determine the weight of wheel loadings of a vehicle, a weighing apparatus may be provided for each wheel assembly of the vehicle and the vehicle then run upwardly and onto the platform members. Preferably, a platform weighing device will be furnished for each wheel assembly and preferably a number of wedge-shaped blocks or other inclined member will be provided to facilitate the movement of the vehicle wheels upwardly and onto the surface of the platform and thereafter downwardly and onto the ground.

When a weight is imposed upon the top surface of the platform member 21 it tends to be moved downwardly and the weight is transferred through the knife-edged bearing members 26 to the outer end portions of the lever arms 15 and 16. These arms are fulcrumed about the knife-edged bearing members 13 and the tendency then is for the outer edges of the arms to be pressed downwardly and the inner end portions thereof pushed upwardly. Thus the portion of the load imposed upon the arm 15 will force it upwardly and against the load-responsive device 37 and will tend to push it upwardly against the under surface of the platform member 21. Similarly, the portion of the load transferred through the opposite end portion of the platform member will tend to move the outer end portion of the arm 16 downwardly, whereby it will pivot about its bearing members 13 and it will thereby be urged upwardly and against the arm 15 through the rock bar 34. The weight thus imposed across the load-responsive device 37 will bring about a deflection of the members provided thereby and suitable magnetic or electric sensing elements made responsive to this deflection will cause an electrical indication to appear upon the meter or indicator 45 of the control box B.

It is noted that there are no lateral restraints tending to inhibit free movement of the arms 15 and 16, and the arms tend to float between their lower bearing members 13 and the upper bearing members 26. The arm 16 is free to elongate or to be shifted laterally relative to the arm 15 through the particular contact interposed therebetween represented by the rock bar 34 which is free to pivot within the enlarged recesses 33 and 35. The coil springs 30 are simply operative to urge the inner ends of the lever arms upwardly while the coil springs 19 simply urge the lever arms downwardly upon their fulcrums or lower bearing members 13.

In the operation of the apparatus it is unnecessary to centralize a load imposed upon the platform member 21 for the particular lever arm arrangement brings about an addition of the forces or weights appearing respectively at the opposite end portions of the platform member. Thus, for example, if the load is adjacent the right end of the platform member, less upward force will appear at the inner end of lever arm 15 but a greater force will be present at the inner portion of the lever arm 16. The total force, nevertheless, appears across the weight-responsive device 37 and an accurate indication thereof can be obtained.

The weight of the apparatus A is relatively small and is in the nature of about 35 pounds, but can weigh loads up to at least 60,000 pounds. Therefore, it may be readily picked up and transported from one location to another. There is no danger of upsetting the arrangement of the device during movement for the base, platform member, and lever arms are all resiliently anchored together through the bolt and spring structures described.

If it is desired to change the capacity of the apparatus it is only necessary to remove the load-responsive device 37 and substitute therefor a load-responsive device having greater or lesser capacity as may be desired. This will not require a readjustment of the lever arms and the change can be accomplished with a minimum of time.

The response obtained through the apparatus disclosed is accurate within close limits, for mechanical hysteresis has been held to a negligible amount. It is seen that the load-responsive device 37 floats freely in position between the lever arm 15 and bearing plate 40 while each of the lever arms in turn is supported so that no resistive forces tend to constrain free movement thereof. The response of the device is quite rapid and a vehicle can be rolled onto a number of devices and the wheel loadings determined without the vehicle having to stop completely for the shifting of the weight from one end of the platform to the other will not change the magnitude of the total load applied to the device 37 through the arms 15 and 16. In the same vein, the total vertical movement of the inner end portions of the lever arms is extremely small and there is practically no fluctuation in the position of the inner end portions of the lever arms as a load rolls from one end of the platform to the other.

While in the foregoing specification an embodiment of the invention has been described in considerable detail for purposes of illustration, it will be apparent to those skilled in the art that considerable deviation may be made in such details without departing from the spirit and principles of the invention.

I claim:

1. In a device of the character described, a base, a pair of lever arms each pivotally supported intermediate the ends thereof upon said base so that the inner end portions thereof overlap vertically, a platform member supported upon said lever arms at points spaced outwardly from the pivotal supports of the respective arms, electric means interposed between said platform member and the inner end portions of said arms for receiving the force appearing at the inner end portions of the arms when a load is imposed upon said platform member, and a rock bar interposed between the overlapped inner end portions of said lever arms to orient the forces present therebetween along lines substantially normal to the planes thereof.

2. The structure of claim 1 in which each of said lever arms is pivotally supported on upwardly-oriented, knife-edged bearing members carried by said base.

3. The structure of claim 1 wherein said platform member is equipped with knife-edged bearing members that bear against the outer end portions of said lever arms.

4. In apparatus of the character described, a platform member equipped with depending side and end walls, downwardly facing knife-edged bearing members carried by the opposite end walls of said platform member, a base, upwardly facing knife-edged bearing members carried by said base inwardly from the depending end walls of said platform member and in substantial parallel alignment with said first-mentioned knife-edged bearing members, a pair of lever arms extending inwardly toward the center of said platform member and with the inner end portions thereof vertically overlapped, each of said lever arms being pivoted upon the knife-edged bearing members carried by said base and being engaged adjacent their outer ends by the knife-edged bearing members carried by said platform member, a rock bar interposed between the overlapped inner end portions of said lever arms to orient forces present therebetween in planes substantially normal thereto, and electric means interposed between said lever arms and said platform member for responding to the magnitude of a load imposed thereacross, said means being floatingly carried between the platform member and lever arms.

5. In a platform type weighing apparatus, a base, a pair of lever arms extending inwardly toward the center of said apparatus from opposite end portions of said base, means for supporting said lever arms upon said base with a line contact whereby said lever arms are free to pivot with substantially no frictional resistance impeding such movement, said means being spaced inwardly from the ends of said lever arms, a platform member, means adjacent the end portions of said lever arms for supporting said platform thereon in substantially a line contact whereby the lever arms are free to pivot with substantially no frictional resistance impeding such movement, the inner end portions of said lever arms being vertically overlapped whereby a force transposed through said platform member and to said lever arms results in the inner end portions of the lever arms providing an upward force, the inner end portions of said lever arms being spaced from said platform member whereby a load-responsive means may be interposed between the lever arms and said platform member, and a rock bar carried between the inner end portions of said lever arms and having knife edges engaging each whereby free relative longitudinal movement between the lever arms is afforded.

6. The structure of claim 5 in which said means for supporting said lever arms upon said base are a plurality of knife-edged bearing members, the knife edges of which engage said lever arms.

7. The structure of claim 6 in which said means for supporting said platform member upon said lever arms are a plurality of knife-edged bearing members, the knife edges of which engage said lever arms.

8. The structure of claim 5 in which a plurality of spring members are provided, certain of the spring members being oriented and arranged to resiliently urge each of said lever arms toward said base and certain other of said spring members being oriented and arranged to urge each of said lever arms toward said platform member.

References Cited in the file of this patent

UNITED STATES PATENTS

| 998,066 | Zimmerman | July 18, 1911 |
| 1,606,333 | Averill | Nov. 9, 1926 |
| 1,844,080 | Troll | Feb. 9, 1932 |
| 1,895,502 | Vernet et al. | Jan. 31, 1933 |
| 1,896,906 | Lichtenberg | Feb. 7, 1933 |
| 2,241,348 | Hem | May 6, 1941 |
| 2,516,545 | Brewster | July 25, 1950 |
| 2,657,921 | MacBride | Nov. 3, 1953 |

FOREIGN PATENTS

| 9,426 | Great Britain | 1911 |
| 231,116 | Great Britain | Mar. 26, 1925 |
| 384,227 | Great Britain | Dec. 1, 1932 |